(12) United States Patent
Li

(10) Patent No.: US 7,877,491 B2
(45) Date of Patent: *Jan. 25, 2011

(54) COOKIE INVALIDATION OR EXPIRATION BY A SWITCH

(75) Inventor: Rui Li, Alviso, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/760,545

(22) Filed: Apr. 14, 2010

(65) Prior Publication Data

US 2010/0226367 A1    Sep. 9, 2010

Related U.S. Application Data

(63) Continuation of application No. 10/364,892, filed on Feb. 11, 2003, now Pat. No. 7,720,977.

(51) Int. Cl.
*G06F 15/16* (2006.01)
(52) U.S. Cl. .................. 709/228; 709/223; 709/227
(58) Field of Classification Search .................. 709/227, 709/228
See application file for complete search history.

(56) References Cited

U.S. PATENT DOCUMENTS

| 6,134,531 | A | 10/2000 | Trewitt et al. |
|---|---|---|---|
| 6,374,300 | B2 | 4/2002 | Masters |
| 6,473,802 | B2 | 10/2002 | Masters |
| 6,510,439 | B1 | 1/2003 | Rangarajan et al. |
| 6,658,463 | B1 | 12/2003 | Dillon et al. |
| 7,233,997 | B1 | 6/2007 | Leveridge et al. |
| 2002/0169712 | A1 | 11/2002 | Ginzboorg et al. |
| 2006/0036875 | A1 | 2/2006 | Karoubi |
| 2007/0180048 | A1 | 8/2007 | Crick et al. |

OTHER PUBLICATIONS

Office Action in U.S. Appl. No. 10/364,892, mailed Aug. 10, 2006.
Office Action in U.S. Appl. No. 10/364,892, mailed Dec. 29, 2006.
Office Action in U.S. Appl. No. 10/364,892, mailed Jun. 25, 2007.
Office Action in U.S. Appl. No. 10/364,892, mailed Dec. 28, 2007.
Office Action in U.S. Appl. No. 10/364,892, mailed Aug. 14, 2009.
Office Action in U.S. Appl. No. 10/364,892, mailed Jan. 13, 2010.
Notice of Allowance in U.S. Appl. No. 10/364,892, mailed Apr. 2010.
U.S. Appl. No. 12/781,787, filed May 17, 2010.

*Primary Examiner*—Ramy M Osman
(74) *Attorney, Agent, or Firm*—Nixon Peabody LLP; John P. Schaub

(57) ABSTRACT

A switch may be used to force the expiration of a cookie on a user's system by inserting an expiration field into the cookie contained in a network response packet. Additionally, a mechanism is provided to delete or damage a cookie contained in a network request packet, so that server software is not disrupted by the receipt of a cookie. Deleting a cookie results in a cleaner request, but damaging a cookie may be more efficient in certain circumstances. By providing these features, an efficient cookie switching design is provided.

20 Claims, 5 Drawing Sheets

COOKIE INVALIDATION OR EXPIRATION BY A SWITCH

CROSS-REFERENCE TO RELATED APPLICATION

The present application is a continuation of application Ser. No. 10/364,892, filed on Feb. 11, 2003, entitled "COOKIE INVALIDATION OR EXPIRATION BY A SWITCH," in the name of the same inventor and commonly owned herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of switching in a computer network. More particularly, the present invention relates to the invalidation or expiration of cookies by a switch in a computer network.

BACKGROUND OF THE INVENTION

Due to increased traffic on the Internet, many web sites now comprise a series of redundant servers controlled by a switch. FIG. 1 is a diagram illustrating an example of a computer network with redundant servers. The plurality of redundant servers 104a-104e are managed by a switch 102, which may direct traffic from a user 100 to an appropriate server based on various Quality of Service (QoS) parameters. For example, the switch 102 may perform load balancing, where traffic is directed to servers that are best able to handle the bandwidth and processor load required at the time the traffic is received.

In certain circumstances, however, it is beneficial to route traffic from a single user to the same server or server group each time a transaction (which may include a request and a response) is made. Normally, however, the traffic is routed based solely on the current server load. One solution to this would be to examine the source of the traffic (i.e., the user's IP address) and use that information to route the traffic to the same server or server group as was used in the last transmission.

Unfortunately, it is not always possible to distinguish individual users by their IP address, such as where network address translation is used (NAT). For these cases, it may be helpful to utilize cookies to identify individual users. When a client makes a request from a server, the response from the server can contain a cookie embedded into the Hypertext Transport Protocol (HTTP) header of the response. The client may then store the cookie and, upon subsequent requests, place the cookie into the HTTP header of the request. The server may then perform cookie switching for any HTTP request containing a cookie, routing the request to an appropriate server identified by the cookie.

Some companies, however, would need to significantly alter the software code running on their servers in order to provide for the ability to generate cookies. For these companies, a solution wherein the switch itself generated the cookies would be more beneficial. In this implementation, the switch would introduce a cookie to the HTTP response when it receives it, before forwarding it back to the user. Each incoming HTTP request would be examined to determine if a valid cookie identifies a preferred server for routing, and route the request accordingly.

Several problems, however, are introduced by such an implementation. First, it may sometimes be necessary for a particular cookie to be deleted from the user's computer, for example if the corresponding server is down or has been removed from the system. However, currently no mechanism exists allowing the switch to indicate that a cookie should be deleted from the user's computer. Furthermore, some companies may have software that is incompatible with cookies, even to such an extent as to crash or otherwise interfere with the performance of the software if an http request is received containing a cookie, even if the software is not planning on doing anything with the cookie. Currently, no mechanism exists for removing the cookie before it arrives at such a company's server. Therefore, a need exists for a solution that can overcome these problems.

BRIEF DESCRIPTION OF THE INVENTION

A switch may be used to force the expiration of a cookie on a user's system by inserting an expiration field into the cookie contained in a network response packet. Additionally, a mechanism is provided to delete or damage a cookie contained in a network request packet, so that server software is not disrupted by the receipt of a cookie. Deleting a cookie results in a cleaner request, but damaging a cookie may be more efficient in certain circumstances. By providing these features, an efficient cookie switching design is provided.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
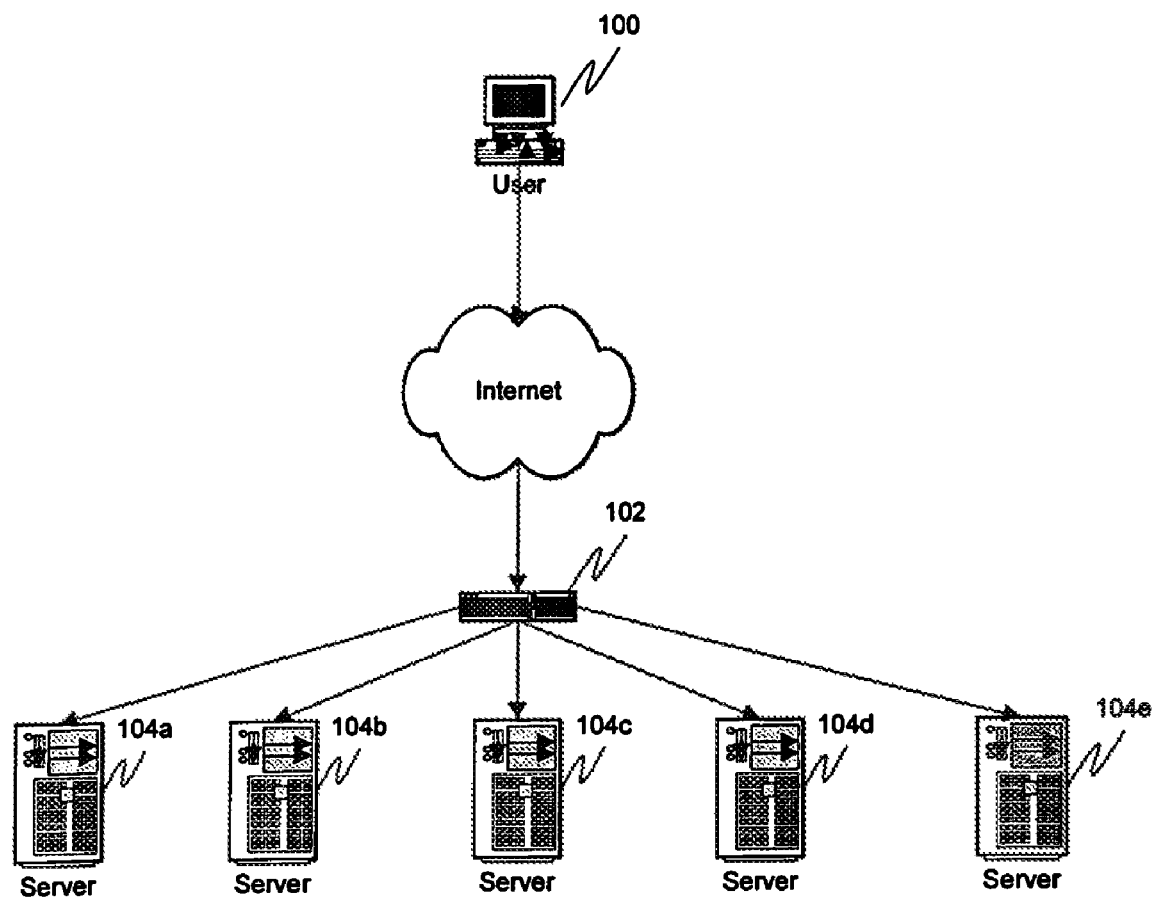
FIG. 1 is a diagram illustrating an example of a computer network with redundant servers.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Furthermore, the present invention is described in the context of a switch. However, one of ordinary skill in the art will recognize that the term switch should be read broadly, so as to include any device that directs packets, including a router and a gateway.

The present invention provides a mechanism for a switch to force the expiration of a cookie on a user's system. Additionally, a mechanism is provided to delete or damage a cookie contained in a request, so that server software is not disrupted by the receipt of a cookie. Deleting a cookie results in a cleaner request, but damaging a cookie may be more efficient in certain circumstances. By providing these features, the present invention allows for a robust and efficient cookie switching design. Furthermore, the invention may be expanded to invalidate any portions of the header other than the cookie, should the need arise.

In an embodiment of the present invention, an extra field may be added to a cookie in an http response indicating when it should expire. This may be helpful for two reasons. First, this allows for a switch having knowledge that a server will be going down (for example, for scheduled maintenance) or removed to provide for a timing mechanism wherein the cookie continues to function until a predetermined time arrives. Second, this allows for a switch to force the immediate deletion of an existing cookie on the user's system. In the second case, the switch need only transmit an empty cookie but having an expiration time that has already been reached.

Thus, a corresponding cookie may appear as follows:
Cookie: FoundryFoo=; path=/; domain=www.foundrynet.com; expires=Tue, 01-Jan-1980 00:00:00 GMT This cookie indicates that the cookie "FoundryFoo", which is valid for all paths within domain www.foundrynet.com, will be expired immediately from both the memory and the hard drive on the user's system. By setting the cookie to empty, the cookie may be invalidated during the current browser session of the user. Typically, the cookie expiration time would only be examined upon the beginning or ending of a browser session, thus merely setting the expiration time to a past time may not immediately invalidate the cookie.

In another embodiment of the present invention, a global clock may be supported for this expiration time. For purposes of this application, global clock should be construed as meaning any clock not controlled by the device performing the specified act (i.e. the switch, or the user's system). This provides much more accuracy than using local clocks, which can potentially have significant time variations from one system to the next. For example, a network time protocol server (NTP) may be provided which may interface with both the switch and the user's system. One of ordinary skill in the art will recognize that NTP may be embodied in several different ways using many different devices, and that it is possible to communicate via NTP without actually communicating directly with an NTP server.

Removal of a cookie in a request may be accomplished in two different ways. In one embodiment, the cookie may actually be deleted from the request. Here, for example, a single cookie is deleted by deleting the entire cookie header:
Cookie: FoundryFoo=1234\r\n
gets entirely deleted.

For more complicated cases where the cookie to be deleted is only one of a number of cookies in a cookie header, the switch should locate only the appropriate cookie to delete, lest valuable information be lost. For example:
Cookie: Address=Washington; FoundryFood=1234; name=Mike\r\n
may become:
Cookie: Address=Washington; name=Mike\r\n One potential problem with cookie deletion, however, is that full deletion gives rise to the possibility that the full checksum of the packet needs to be recalculated due to the change in the packet length. Therefore, it may be beneficial in certain circumstance to damage the cookie without deleting it. In an embodiment of the present invention, damaging the cookie may be performed by swapping four bytes of the cookie name (or cookie header name if there is only a single cookie in the header). This can be more efficient since it invalidates the cookie without having to change the packet size and recalculate the checksum. It will often be the first four bytes of the cookie name or cookie header name being swapped. However, if the first byte of the cookie name of cookie header name is not an even byte from the start of the packet, it may be more efficient to swap the second to fifth bytes rather than the first to fourth. This is because checksums are typically calculated by looking at every two bytes of data in the packet and calculating a value based on those two bytes, then adding it to a value for the next two bytes, etc. If the bytes to be swapped do not start on an even byte, the checksum calculation may be incorrect.

Figure 2:
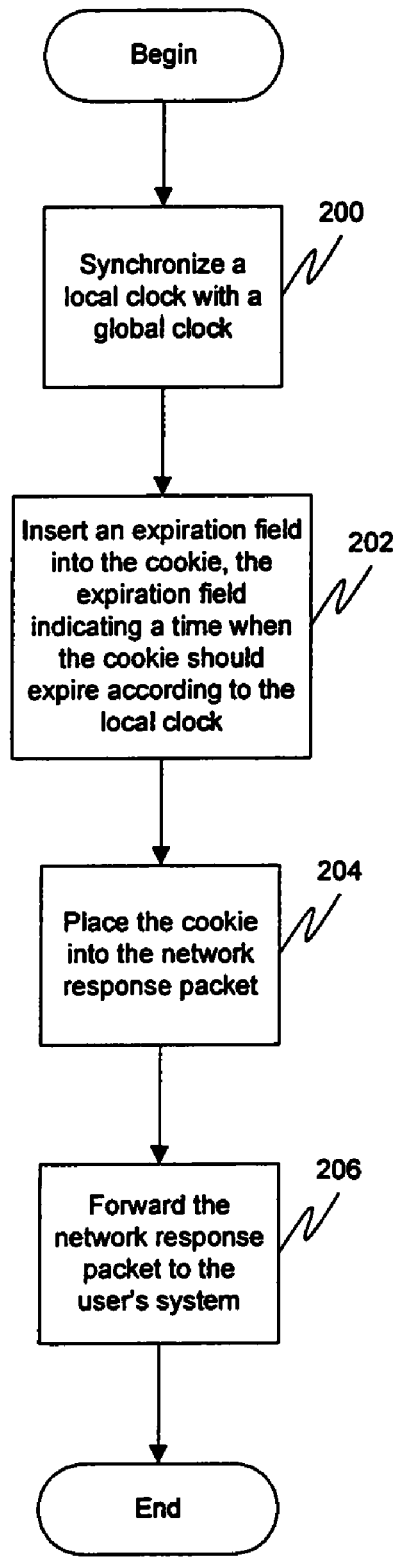
FIG. 2 is a flow diagram illustrating a method for adding a cookie to a network response packet at a switch in accordance with an embodiment of the present invention.

The four bytes may be swapped by swapping the first of the four bytes with the second of the four bytes, and the third with the fourth. As described above, this allows the data to be modified without affecting the checksums. Thus, in an example with only one cookie:
Cookie: FoundryFoo=1234\r\n
then the cookie header name may be damaged to read:
okCoie: FoundryFoo=1234\r\n
For an example with multiple cookies:
Cookie: Address=Washington; FoundryFoo=1234; name=Mike\r\n
then the cookie name may be damaged to read:
Cookie: Address=Washington; unFodryFoo=1234; name=Mike\r\n If, however, in the first example above, the cookie header name begins on an odd byte, then the second through fifth bytes are the ones that will be affected. Thus:

Cookie: FoundryFoo=1234\r\n
would be damaged to read:
Ckiooe: FoundryFoo=1234\r\n FIG. 2 is a flow diagram illustrating a method for adding a cookie to a network response packet at a switch in accordance with an embodiment of the present invention. At 200, a local clock may be synchronized with a global clock. The global clock may be a Network Time Protocol (NTP) clock, which may interface with the switch and a user's system, although that is not essential. The synchronization may be performed periodically. At 202, an expiration field may be inserted into the cookie, the expiration field indicating a time when the cookie should expire according to the local clock. The expiration field may indicate a time that has already passed if it is desired that a previously stored cookie on the user's system be invalidated immediately, although that is not essential. Additionally, a cookie value for the cookie may be empty if it is desired that a previously stored cookie on the user's system be invalidated, although that is not essential. At 204, the cookie may be placed into the network response packet. At 206, the network response packet may be forwarded to the user's system. In an embodiment of the present invention, the expiration time to be inserted is recalculated every 20 seconds rather than per each network response packet. This avoids thousands of calculations of the expiration time.

Figure 3:
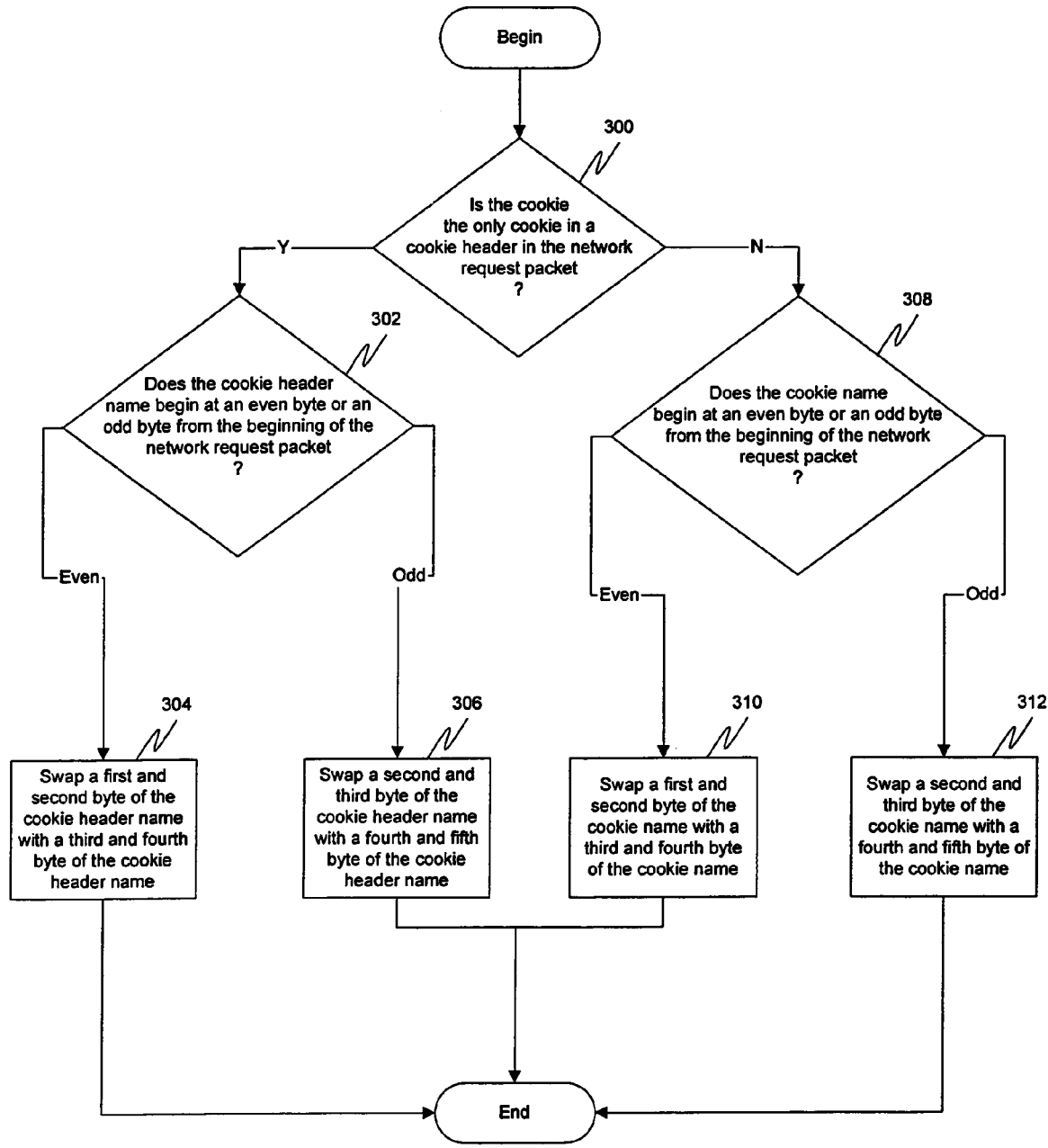
FIG. 3 is a flow diagram illustrating a method for invalidating a cookie from a network request packet at a switch in accordance with an embodiment of the present invention.

FIG. 3 is a flow diagram illustrating a method for invalidating a cookie from a network request packet at a switch in accordance with an embodiment of the present invention. At 300, it is determined if the cookie is the only cookie in a cookie header in the network request packet or if the cookie is only one of a plurality of cookies in the network request packet. If it is the only cookie in a cookie header in the network request packet, at 302 it is determined if a cookie header name begins at an even byte or an odd byte from a beginning point of the header of the network request packet. If it is an even byte, then at 304 a first odd byte/even byte pair of the cookie header name may be swapped with a second odd byte/even byte pair of the cookie header name. If it is an odd byte, then at 306 a first even byte/odd byte pair of the cookie header name may be swapped with a second even byte/odd byte pair of the cookie header name. An odd byte/even byte pair is an odd byte followed by an even byte, while an even byte/odd byte pair is an even byte followed by an odd byte. In an embodiment of the present invention, the first odd byte/even byte pair may be the first and second bytes from the beginning of the cookie header name, while the second odd byte/even byte pair may be the third and fourth bytes. Additionally, the first even byte/odd byte pair may be the second and third bytes from the beginning of the cookie header name, while the second even byte/odd byte pair may be the fourth and fifth bytes.

If, on the other hand, the cookie is one of a plurality of cookies in the network request packet, then at 308 it is determined if a cookie name corresponding to the cookie begins at an even byte or an odd byte from a beginning point of the header of the network request packet. If it is an even byte, then at 310 a first odd byte/even byte pair of the cookie name may be swapped with a second odd byte/even byte pair of the cookie name. If it is an odd byte, then at 312 a first even byte/odd byte pair of the cookie name may be swapped with a second even byte/odd byte pair of the cookie name. An odd byte/even byte pair is an odd byte followed by an even byte, while an even byte/odd byte pair is an even byte followed by an odd byte. In an embodiment of the present invention, the first odd byte/even byte pair may be the first and second bytes from the beginning of the cookie name, while the second odd byte/even byte pair may be the third and fourth bytes. Additionally, the first even byte/odd byte pair may be the second and third bytes from the beginning of the cookie name, while the second even byte/odd byte pair may be the fourth and fifth bytes.

While it is not essential, the method may only be performed for network request packets to be routed to a particular server and wherein the particular server is registered as not wanting to receive the cookie.

Figure 4:
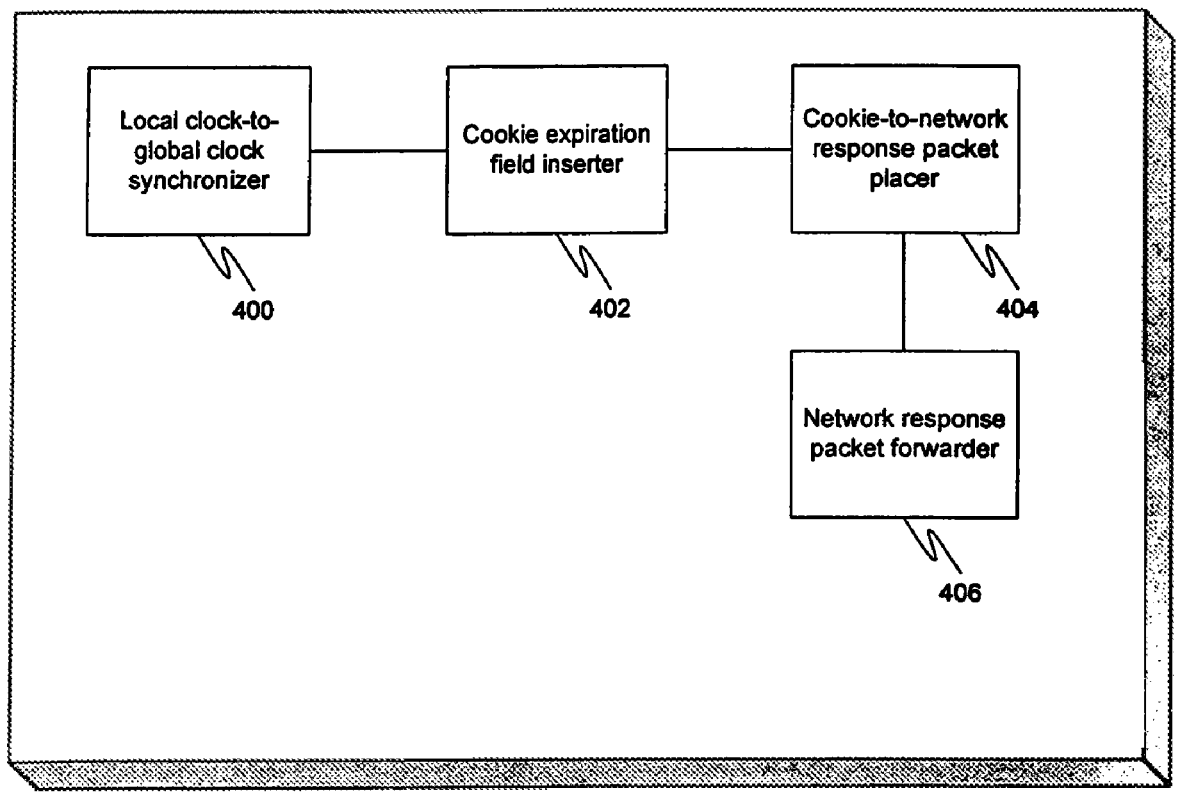
FIG. 4 is a block diagram illustrating a switch for adding a cookie to a network response packet at a switch in accordance with an embodiment of the present invention.

FIG. 4 is a block diagram illustrating a switch for adding a cookie to a network response packet at a switch in accordance with an embodiment of the present invention. A local clock-to-global clock synchronizer 400 may synchronize a local clock with a global clock. The global clock may be a Network Time Protocol (NTP) clock, which may interface with the switch and a user's system, although that is not essential. The synchronization may be performed periodically. A cookie expiration field inserter 402 coupled to the local clock-to-global clock synchronizer 400 may insert an expiration field into the cookie, the expiration field indicating a time when the cookie should expire according to the local clock of the user. The expiration field may indicate a time that has already passed if it is desired that a previously stored cookie on the user's system be invalidated, although that is not essential. Additionally, a cookie value for the cookie may be empty if it is desired that a previously stored cookie on the user's system be invalidated, although that is not essential. A cookie-to-network response packet placer 404 coupled to the cookie expiration field inserter 402 may place the cookie in a cookie header in the network response packet. A network response packet forwarder 406 coupled to the cookie-to-network response packet placer 404 may forward the network response packet may be forwarded to the user's system. In an embodiment of the present invention, the expiration time to be inserted is recalculated every 20 seconds rather than per each network response packet. This avoids thousands of calculations of the expiration time.

Figure 5:
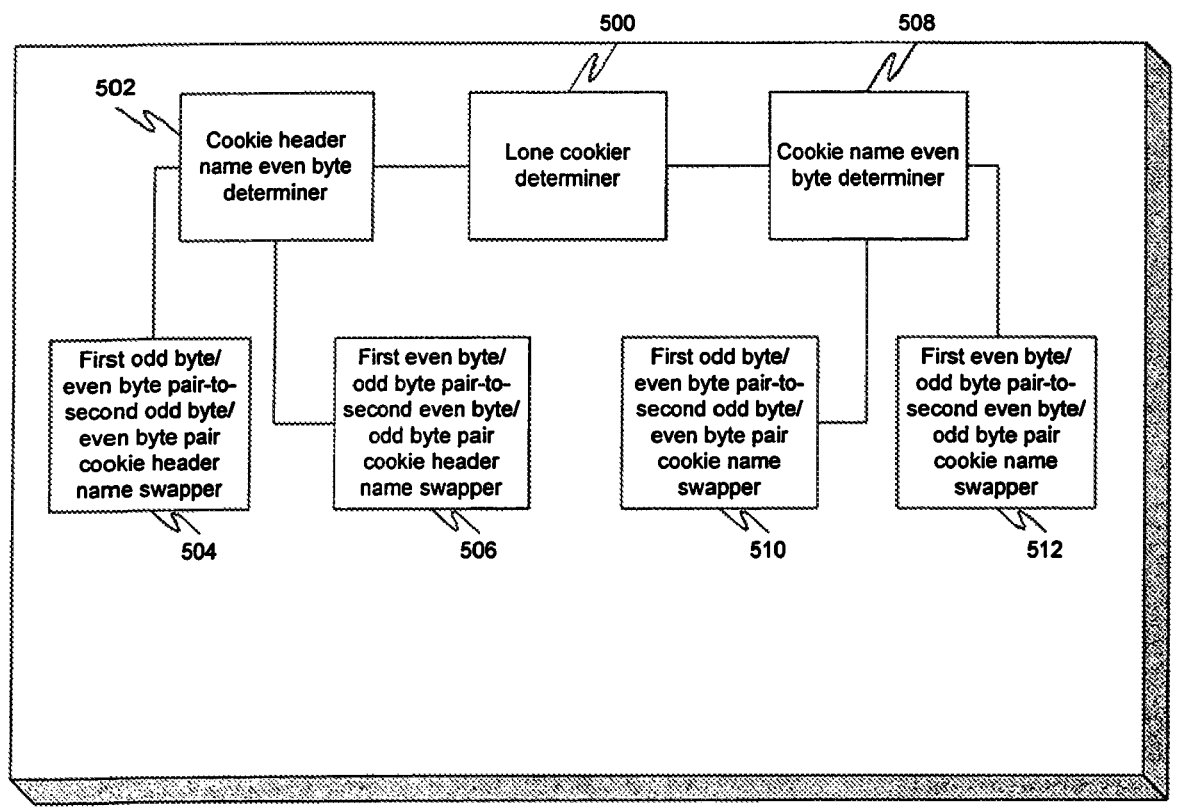
FIG. 5 is a block diagram illustrating a switch capable of invalidating a cookie from a network request packet at a switch in accordance with an embodiment of the present invention.

FIG. 5 is a block diagram illustrating a switch capable of invalidating a cookie from a network request packet at a switch in accordance with an embodiment of the present invention. A lone cookie determiner 500 may determine if the cookie is the only cookie in a cookie header in the network request packet or if the cookie is only one of a plurality of cookies in the network request packet. If it is the only cookie in a cookie header in the network request packet, a cookie header name even byte determiner 502 coupled to the lone cookie determiner 500 may determine if a cookie header name begins at an even byte or an odd byte from a beginning point of the network request packet. If it is an even byte, then a first odd byte/even byte pair-to-second odd byte/even byte pair cookie header name swapper 504 coupled to the cookie header name even byte determiner 502 may swap a first odd byte/even byte pair of the cookie header name with a second odd byte/even byte pair of the cookie header name. If it is an odd byte, then a first even byte/odd byte pair-to-second even byte/odd byte pair cookie header name swapper 506 coupled to the cookie header name even byte determiner 502 may swap a first even byte/odd byte pair of the cookie header name with a second even byte/odd byte pair of the cookie header name. An odd byte/even byte pair is an odd byte followed by an even byte, while an even byte/odd byte pair is an even byte followed by an odd byte. In an embodiment of the present invention, the first odd byte/even byte pair may be the first and second bytes from the beginning of the cookie header name, while the second odd byte/even byte pair may be the third and fourth bytes. Additionally, the first even byte/odd byte pair may be the second and third bytes from the beginning of the cookie header name, while the second even byte/odd byte pair may be the fourth and fifth bytes.

If, on the other hand, the cookie is one of a plurality of cookies in the network request packet, then a cookie name even byte determiner 508 coupled to the lone cookie determiner 500 may determine if a cookie name corresponding to the cookie begins at an even byte or an odd byte from a beginning point of the network request packet. If it is an even byte, then a first odd byte/even byte pair-to-second odd byte/even byte pair cookie name swapper 510 coupled to the cookie name even byte determiner 508 may swap a first odd byte/even byte pair of the cookie name with a second odd byte/even byte pair of the cookie name. If it is an odd byte, then a first even byte/odd byte pair-to-second even byte/odd byte pair cookie name swapper 512 coupled to the cookie name even byte determiner 508 may swap a first even byte/odd byte pair of the cookie name with a second even byte/odd byte pair of the cookie name. An odd byte/even byte pair is an odd byte followed by an even byte, while an even byte/odd byte pair is an even byte followed by an odd byte. In an embodiment of the present invention, the first odd byte/even byte pair may be the first and second bytes from the beginning of the cookie name, while the second odd byte/even byte pair may be the third and fourth bytes. Additionally, the first even byte/odd byte pair may be the second and third bytes from the beginning of the cookie name, while the second even byte/odd byte pair may be the fourth and fifth bytes.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   at a network device configured to perform packet switching, calculating a last calculated time at a fixed interval comprising a fixed number of seconds, the last calculated time indicating when a cookie should expire according to a local clock that was synchronized with a global clock;
   inserting into a cookie, an expiration field indicating the last calculated time; and
   placing the cookie into a network response packet.

2. The method of claim 1 wherein the global clock is a source of Network Time Protocol (NTP) signals.

3. The method of claim 2, further comprising forwarding the network response packet toward a user's system.

4. The method of claim 1 wherein the expiration field indicates a time that has already passed if it is desired that a previously stored cookie on a user's system be invalidated.

5. The method of claim 4 wherein a cookie value for the cookie is empty if it is desired that a previously stored cookie on a user's system be invalidated.

6. The method of claim 1 wherein the last calculated time indicates an absolute time.

7. The method of claim 1 wherein the fixed number of seconds is less than one second.

8. The method of claim 1 wherein the fixed number of seconds is more than one second.

9. The method of claim 1 wherein the fixed number of seconds is one second.

10. An apparatus comprising:
    a memory; and
    one or more processors configured to:
        calculate a last calculated time at a fixed interval comprising a fixed number of seconds, the last calculated time indicating when a cookie should expire according to a local clock that was synchronized with a global clock, the apparatus configured to perform packet switching;
        insert into a cookie, an expiration field indicating the last calculated time; and
        place the cookie into a network response packet.

11. The apparatus of claim 10 wherein the global clock is a source of Network Time Protocol (NTP) signals.

12. The apparatus of claim 11 wherein the one or more processors are further configured to forward the network response packet toward a user's system.

13. The apparatus of claim 10 wherein the expiration field indicates a time that has already passed if it is desired that a previously stored cookie on a user's system be invalidated.

14. The apparatus of claim 13 wherein a cookie value for the cookie is empty if it is desired that a previously stored cookie on a user's system be invalidated.

15. The apparatus of claim 10 wherein the last calculated time indicates an absolute time.

16. The apparatus of claim 10 wherein the fixed number of seconds is less than one second.

17. The apparatus of claim 10 wherein the fixed number of seconds is more than one second.

18. The apparatus of claim 10 wherein the fixed number of seconds is one second.

19. An apparatus comprising:
    means for, at a network device configured to perform packet switching, calculating a last calculated time at a fixed interval comprising a fixed number of seconds, the last calculated time indicating when a cookie should expire according to a local clock that was synchronized with a global clock;
    means for inserting into a cookie, an expiration field indicating the last calculated time; and
    means for placing the cookie into a network response packet.

20. A program storage device readable by a machine, embodying a program of instructions executable by the machine to perform a method, the method comprising:
    at a network device configured to perform packet switching, calculating a last calculated time at a fixed interval comprising a fixed number of seconds, the last calculated time indicating when a cookie should expire according to a local clock that was synchronized with a global clock;
    inserting into a cookie, an expiration field indicating the last calculated time; and
    placing the cookie into a network response packet.

* * * * *